(12) United States Patent
Vardy et al.

(10) Patent No.: US 10,015,171 B1
(45) Date of Patent: Jul. 3, 2018

(54) AUTHENTICATION USING METADATA FROM POSTS MADE TO SOCIAL NETWORKING WEBSITES

(71) Applicant: EMC Corporation, Hopkinton, MA (US)

(72) Inventors: Tamar Vardy, Tel Aviv (IL); Simon D. Samra, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 47 days.

(21) Appl. No.: 14/645,529

(22) Filed: Mar. 12, 2015

(51) Int. Cl.
*H04L 29/06* (2006.01)

(52) U.S. Cl.
CPC ............ *H04L 63/102* (2013.01); *H04L 63/08* (2013.01)

(58) Field of Classification Search
CPC ............................... H04L 63/102; H04L 63/08
USPC ............................................................ 726/7
See application file for complete search history.

(56) References Cited

U.S. PATENT DOCUMENTS

| | | | | |
|---|---|---|---|---|
| 7,526,412 B2* | 4/2009 | Mani | ....................... | G06F 21/32 702/194 |
| 8,220,034 B2* | 7/2012 | Hahn | .................... | H04L 63/083 726/2 |
| 9,147,117 B1* | 9/2015 | Madhu | ................ | H04L 63/0861 |
| 9,235,865 B1* | 1/2016 | Zang | ....................... | H04W 4/21 |
| 9,720,935 B2* | 8/2017 | Hunt | ................. | G06F 17/30268 |
| 2014/0081817 A1* | 3/2014 | Secrist | ................... | G06Q 40/00 705/35 |
| 2015/0088798 A1* | 3/2015 | Ghosh | .................... | G06Q 10/04 706/46 |
| 2015/0127527 A1* | 5/2015 | Eide | ...................... | G06Q 20/227 705/39 |
| 2015/0193774 A1* | 7/2015 | Wetzel | .............. | G06Q 20/4016 705/44 |

\* cited by examiner

*Primary Examiner* — Harris C Wang
(74) *Attorney, Agent, or Firm* — BainwoodHuang

(57) ABSTRACT

Improved techniques of performing authentication involve extracting metadata from posts made by legitimate users on a social networking website and generating authentication results based in part on the extracted metadata. For example, in response to an authentication request being made from a device of a legitimate user, an authentication server obtains metadata describing one or more posts made by the legitimate user on the social networking website. The authentication server may then input the metadata to a risk engine, along with information gathered from the user's device. The risk engine then generates a risk score that indicates a likelihood that the request is fraudulent, based at least in part of whether the metadata obtained from the social networking website is consistent with the information obtained from the user's device.

17 Claims, 5 Drawing Sheets

Social Networking Post DB
142

| Post DB Entries 200 | | | Geolocation 216 | |
| Post Content 210 | User ID 212 | Timestamp 214 | Latitude 216a | Longitude 216b |
| --- | --- | --- | --- | --- |
| <Post Data> | 111234 | 150223031423 | 42.346676 | -71.097218 |
| <Post Data> | 111234 | 150223033401 | 42.347380 | -71.095142 |
| <Post Data> | 111234 | 150223050245 | 42.348462 | -71.084317 |

...

Device Information 129

| | | Geolocation 224 | |
| Request ID 220 | Timestamp 222 | Latitude 224a | Longitude 224b |
| --- | --- | --- | --- |
| 978645 | 150223031653 | 42.090946 | -71.264346 |

AUTHENTICATION USING METADATA FROM POSTS MADE TO SOCIAL NETWORKING WEBSITES

BACKGROUND

Some institutions allow users to conduct electronic transactions over a network. For example, a bank may provide a web application that allows an account holder to access an account, or a corporation may provide an intranet through which authorized employees can access sensitive documents. When a user initiates an electronic transaction, the user may provide a username and password to conduct the transaction. However, there is a risk that a malicious actor might fraudulently conduct a transaction by obtaining the username and correctly guessing the password.

To combat fraud, institutions commonly employ user authentication. Conventional approaches to user authentication involve obtaining device data, such as IP address, MAC address, and geolocation, from an electronic device operated by a user in response to the user requesting access to a secure resource. The extraction of the device data may be performed in a manner transparent to the user, e.g., by a Javascript application that runs in a browser or by some other application. In some cases, the device data are provided as inputs to a risk engine, which computes a risk score that indicates a likelihood that the transaction is fraudulent. For example, the risk engine takes device data as input and generates a risk score as output. The institution may then use the risk score to decide whether to grant or deny the user's request to access the resource.

SUMMARY

Unfortunately, there are deficiencies in the above-described conventional approach. For example, a malicious actor may take control of a legitimate user's device and pose as the user to mask fraudulent activity. For instance, such an actor may infect the user's device with malware that allows the actor to control the user's device from a remote location, or gain physical possession of the user's device and control the device directly. In such cases, the conventional approaches to authentication that rely on data from the user's device may be undermined.

In contrast with the above-described conventional approach in which malicious actors may defeat authentication by controlling devices belonging to legitimate users, improved techniques of performing authentication involve extracting metadata from posts made by legitimate users on a social networking website and generating authentication results based in part on the extracted metadata. For example, in response to an authentication request being made from a device of a legitimate user, an authentication server obtains metadata describing one or more posts made by the legitimate user on the social networking website. The authentication server may then input the metadata to a risk engine, along with information gathered from the user's device. The risk engine then generates a risk score that indicates a likelihood that the request is fraudulent, based at least in part of whether the metadata obtained from the social networking website is consistent with the information obtained from the user's device.

Advantageously, such metadata provides an independent check of a person requesting access to a resource, thus reducing the risk of fraud. For example, suppose that the legitimate user created a post on a social networking website using a different device. If the user made the post from a location remote from the user's device, the one from which the authentication request was made, at around the same time that the request was made, then it is possible that the user's device has been compromised and is being controlled by a malicious actor. In such a case, the risk engine may generate a high risk score to express the possibility that the user's device has been compromised.

One embodiment of the improved techniques of authentication is directed to a method of authenticating a request to access a resource. The method includes, in response to a request to access a resource having been made on a user device, receiving a message including (i) information identifying the legitimate user and (ii) device information obtained from the user device. The method also includes establishing a connection to a social networking website over a network. The method further includes obtaining metadata from the social networking website over the connection, the metadata describing a set of posts made by the legitimate user on the social networking website. The method further includes generating an authentication result, the authentication result indicating a likelihood that the request is fraudulent, based at least in part of whether the metadata obtained from the social networking website is consistent with the information obtained from the user device.

Additionally, some embodiments are directed to a system constructed and arranged to authenticate a request to access a resource. The system includes an authentication server which in turn includes memory and controlling circuitry coupled to the memory. The controlling circuitry is constructed and arranged to carry out a method of authenticating a request to access a resource.

Further, some embodiments are directed to a computer program product having a non-transitory, computer-readable storage medium which stores executable code, which when executed by a controlling circuitry, causes the controlling circuitry to perform a method of authenticating a request to access a resource.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

Improved techniques of performing authentication involve extracting metadata from posts made by legitimate users on a social networking website and generating authentication results based in part on the extracted metadata. Advantageously, such metadata provides an independent check of a person requesting access to a resource, thus reducing the risk of fraud.

Figure 1:
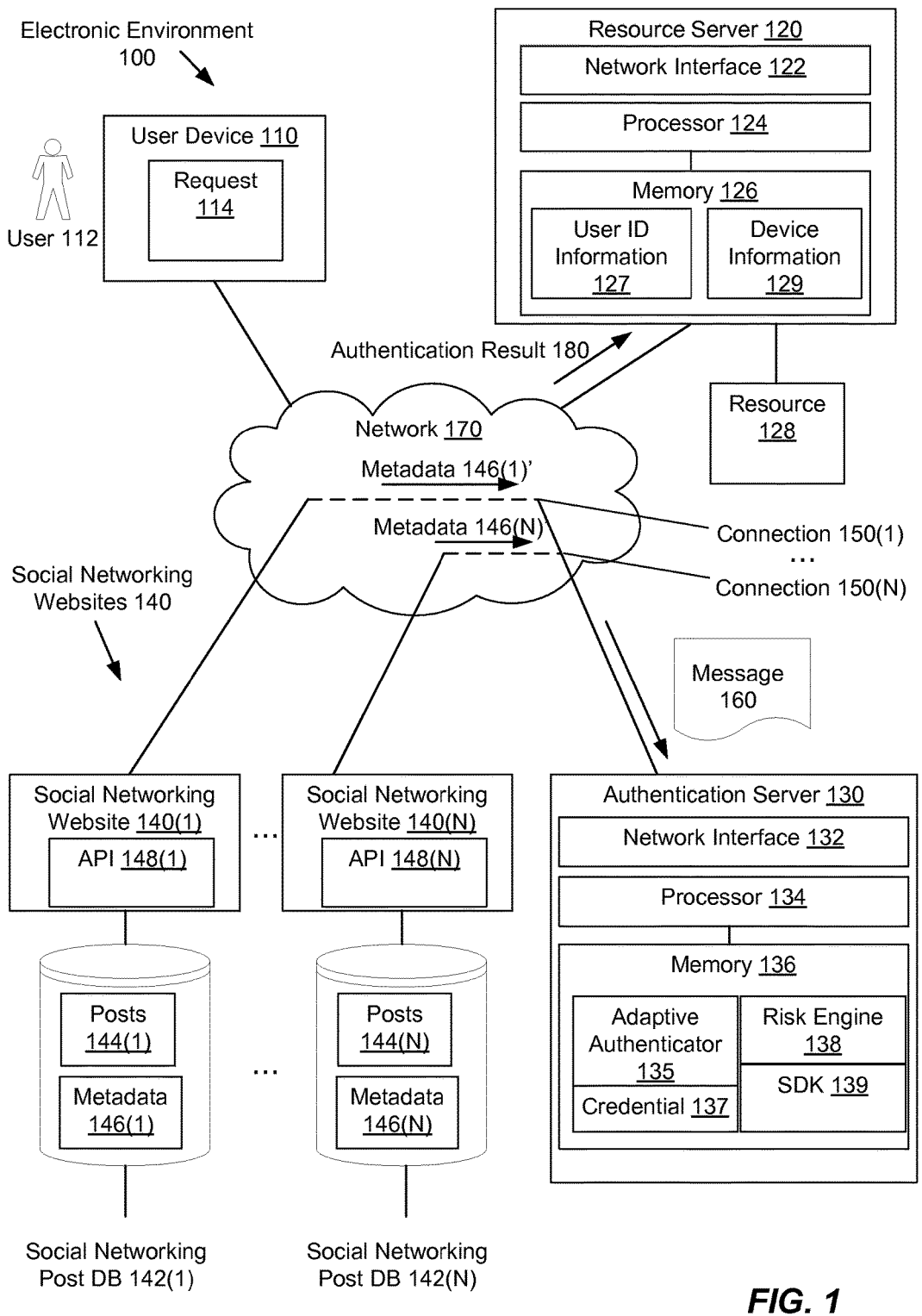
FIG. 1 is a block diagram illustrating an example electronic environment in which the improved technique can be carried out.

FIG. 1 shows an example electronic environment 100 in which embodiments of the improved techniques hereof can be practiced. Within electronic environment 100, user device 110 transmits a request 114 to access resource 128 to resource server 120 over the network 170. In response, resource server 120 generates a message 160 and sends it to authentication server 130. After authentication server 130 receives message 160, authentication server 130 obtains metadata 146(1) describing posts on social networking website 140(1) made by a user 112 identified in message 160. Authentication server 130 then generates an authentication result 180, based on device information contained in message 160 and metadata 146(1), and transmits authentication result 180 to resource server 120 over network 170.

Network 170 provides network connections among user device 110, resource server 120, authentication server 130, and social networking websites 140. Network 170 may implement any of a variety of protocols and topologies that are in common use for communications over the Internet. Furthermore, network 170 may include various components (e.g., cables, switches/routers, gateways/bridges, etc.) that are used in such communications. However, in some arrangements resource server 120 and authentication server 130 are co-located within a machine.

User device 110 may be any electronic device from which user 112 may generate a request such as request 114 to access resource 128 over network 170. For example, user device 110 may be a desktop computer or a laptop computer that runs a browser capable of accessing a website provided by resource server 120. In another example, user device 110 may be a smartphone or a tablet computer that runs an app capable of communicating with resource server 120.

In an example, resource server 120 is a computer system capable of processing a large number of requests to access various resources, including resource 128. For instance, resource server 120 may be operated by a bank that provides online access to accounts for its account holders. In another example, resource server 120 may be operated by a corporation that provides remote access to sensitive documents for certain employees.

Resource server 120 is seen to include a network interface 122, a processor 124, and memory 126. The network interface 122 includes, for example, adapters, such as SCSI target adapters and network interface adapters, for converting electronic and/or optical signals received from the network 170 to electronic form for use by resource server 120. The processor 124 includes one or more processing chips and/or assemblies. The memory 126 includes both volatile memory (e.g., RAM), and non-volatile memory, such as one or more ROMs, disk drives, solid state drives, and the like. The processor 124 and the memory 126 together form control circuitry, which is constructed and arranged to carry out various functions as described herein.

The memory 126 is further constructed and arranged to store data in connection with request 114. Along these lines, request 114 contains information 127 regarding the user 112 and information 129 regarding the user device 110. User information 127 includes a user identifier. Device information 129 includes information about the state of user device 110 when request 114 was made. For example, device information 129 may include a geolocation of user device 110, an IP address from which the geolocation may be determined, and a unique device identifier such as a MAC address. Device information 129 also includes a timestamp indicating a time at which request 114 was made on user device 110.

Set of social networking websites 140 includes any number N of social networking websites 140(1), . . . , 140(N) on which user 112 may create posts. Each social networking website, e.g., social networking website 140(1), is configured to store posts 144(1) within a social networking post database 142(1). Each social networking website 140(1) is further configured to generate metadata 146(1) for each post 144(1). For example, metadata 146(1) may contain information about the time at which user 112 created post 144(1), GPS coordinates of the location of a posting device from which user 112 created post 144(1), the type of data contained in the post (e.g., text, pictures, audio, video), and so on.

Authentication server 130 is a computer system capable of producing authentication result 180 based on the device information 129 and metadata 146(1). It should be understood that authentication result 180 indicates a likelihood of the user 112 who made the set of posts being the same user who made the request on the user device produce authentication result 180. Typically, authentication result 180 takes the form of a risk score generated by a risk engine 138, e.g., the Common Risk Engine from EMC Corp., Hopkinton, Mass.

Authentication server 130 is seen, like resource server 120, to include a network interface 132, a processor 134, and memory 136. The processor 134 and the memory 136 together form control circuitry, which is constructed and arranged to carry out various functions as described herein. Also, the memory 136 includes a variety of software constructs realized in the form of executable instructions, such as adaptive authenticator 135, risk engine 138, and software development kit (SDK) 139. When the executable instructions are run by the set of processing units 134, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons, for example.

The memory 136 is further configured to store a credential 137 that provides permission to access metadata from one of the social networking websites 140, e.g., social networking website 140(1). Authentication server 130 uses credential 137 in conjunction with SDK 139 to obtain metadata 146(1).

In order that authentication server 130 may access post database 142(1), social networking website 140(1) includes an application programming interface (API) 148(1). API 148(1) is configured to process commands generated by SDK 135 so that a specified subset 146(1)' of metadata 146(1) may be transmitted to authentication server 130.

In some arrangements, credential 137 provides permissions to obtain metadata 146(1), . . . , 146(N) from a number N of social networking websites 140. In this case, authentication server 130 may establish any of connections 150(1), . . . , 150(N) with multiple social networking websites 140 to obtain respective metadata 146(1), . . . , 146(N) over each respective connection, e.g., 150(1), . . . , 150(N).

During operation, user device 110 transmits request 114 to resource server 120 to access resource 128 over the network 170. For example, resource server 120 may provide a website to which user device 110 may send request 114 from a browser application. In an example, the browser application contains Javascript provided by resource server 120 that collects device information 129, e.g., a geolocation value and a timestamp.

In response to receiving request 114, resource server 120 generates message 160. Message 160 is designed to provide authentication server 130 with information needed to produce an authentication result. Along these lines, resource server 120 reads user identification information 127 and device information 129 from request 114 and stores them in memory 126. Resource server 120 then generates message 160 from user identification information 127 and device information 129. For example, message 160 may contain a timestamp indicating a time at which request 114 was made on user device 110 and a geolocation of user device 110 at the time request 114 was made. In some arrangements, message 160 may contain additional information concerning resource server 120, e.g., a timestamp indicating a time at which message 160 was generated, a public key and encrypted digital signature of resource server 120 for identity verification, and so on. In other arrangements, when resource server 120 and authentication server 130 are co-located, message 160 may be the same as request 114.

In an example, after authentication server 130 receives message 160 from resource server 120 over network 170, authentication server 130 establishes a connection, e.g., connection 150(1), to a social networking website 140(1) through network 170. For example, as part of a previous registration process, user 112 may have granted authentication server 130 permission to access metadata 146(1)' of posts 144(1) made by user 112 on social networking website 140(1). Such permissions are encapsulated within credential 137. Authentication server 130 then establishes connection 150(1) with social networking website 140(1) by transmitting credential 137 to social networking website 140(1) over network 170.

Once connection 150(1) has been established, authentication server 130 then obtains metadata 146(1)' describing posts on social networking website 140(1) made by user 112. It should be understood that the permissions provided by credential 137 may only allow authentication server 130 to obtain some metadata for posts 144(1) made by user 112, but not other metadata 146(1). However, in some arrangements, credential 137 may provide permissions that allow authentication server 130 to obtain content from posts 144(1) described by metadata 146(1)'.

Once authentication server 130 has obtained metadata 146(1)' and device information 129 contained in message 160, authentication server 130 generates an authentication result 180 based at least in part on device information 129 and metadata 146(1)'. Authentication result 180 indicates a likelihood that the request is fraudulent, based at least in part of whether metadata 146(1)' is consistent with device information 129. For example, authentication server 130 evaluates a function of (i) the geolocation of a posting device from which a post 144(1) described by metadata 146(1)' was created, (ii) the time at which that post 144(1) was created, (iii) the geolocation of user device 110 on which request 114 was made, and (iv) the time at which request 114 was made. Such a function may be defined by adaptive authenticator 135, which identifies patterns of fraud in geolocation data, and risk engine 138, which computes, as a value of the function, a risk score from the patterns identified by adaptive authentication engine 135. Authentication result 180 includes this risk score. In some arrangements, the post 144(1) described by metadata 146(1)' is the most recent post made by user 112 on social networking website 140(1). In other arrangements, authentication server 130 considers, as the geolocation of the posting device, a trend of the geolocation of the posting device over time.

Authentication server 130 then transmits authentication result 180 to resource server 120 over network 170. Resource server 120 grants or denies access to resource 128 based on authentication result 180.

It should be understood that metadata 146(1)' is consistent with device information 129 when it is plausible that the same user that posted a post described by metadata 146(1)' also made a request at which time device information 129 was generated. For example, suppose that metadata 146(1)' indicates that legitimate user 112 made a post 144(1) on social networking website 140(1) from one device located in Boston at 3 PM. If generated device information 129 indicates that request 114 was made from device 110 located in Bermuda at 3:15 PM, then there is a low likelihood that the metadata 146(1)' is consistent with device information 129.

Figure 2:
FIG. 2 is a block diagram illustrating an example social networking post database and example device information within the electronic environment illustrated in FIG. 1.
Figure 2:

FIG. 2 shows contents of an example social networking post database 142. Here, database 142 contains entries 200, each entry 200 having values of the following fields: post content 210, user identifier 212, timestamp 214, and geolocation 216.

The post content field 210 contains content of a particular post made by a user having the value of the user identifier field 212 in entry 200. Because credential 137 allows authentication server 130 to obtain metadata describing posts rather then posts themselves, post content 210 is not part of the obtained metadata 146(1)'. However, in some arrangements, permissions may be granted to obtain post content 210 as well as metadata 146(1)'.

The user identifier field 212 contains an identifier (here, "111234") identifying user 112. Credential 137 allows authentication server 130 to obtain metadata from only those entries 200 having the value of the user identifier field identifying user 112.

Timestamp 214 contains a value indicating a time at which user 112 created the post having content in field 210 of entry 200. In the example shown in FIG. 2, the value of the timestamp field 214 in the first entry 200 is "150223031423," which is interpreted as "03:14.23 on Feb. 23, 2015," and so on for the other entries 200 shown in FIG. 2.

The geolocation field 216 in the example shown in FIG. 2 is split into two entries according to GPS coordinates: longitude 216a and latitude 216b, each in degrees. In some arrangements, the posting device is a desktop computer or a laptop computer that does not possess a device that receives signals providing GPS coordinates. In this case, GPS coordinates may be determined from other factors such as an IP address, cell tower identifier, and so on.

In some arrangements, authentication result 180 is based in part on the geolocation of the most recent post 144(1). However, in other arrangements, authentication result 180 may be based in part on geolocations of several posts 144(1), e.g., a geolocation trend over time. In still other arrangements, the geolocations are selected from metadata 146(k) of posts 144(k) made on another social networking website 140(k), k being any of 2, 3, . . . , N.

FIG. 2 also shows example device information 129. As shown, device information 129 includes a timestamp 222 identifying a time at which request 114 was made on user device 110 and a value of a geolocation 224 containing a latitude value 224a and a longitude value 224b.

Figure 3:
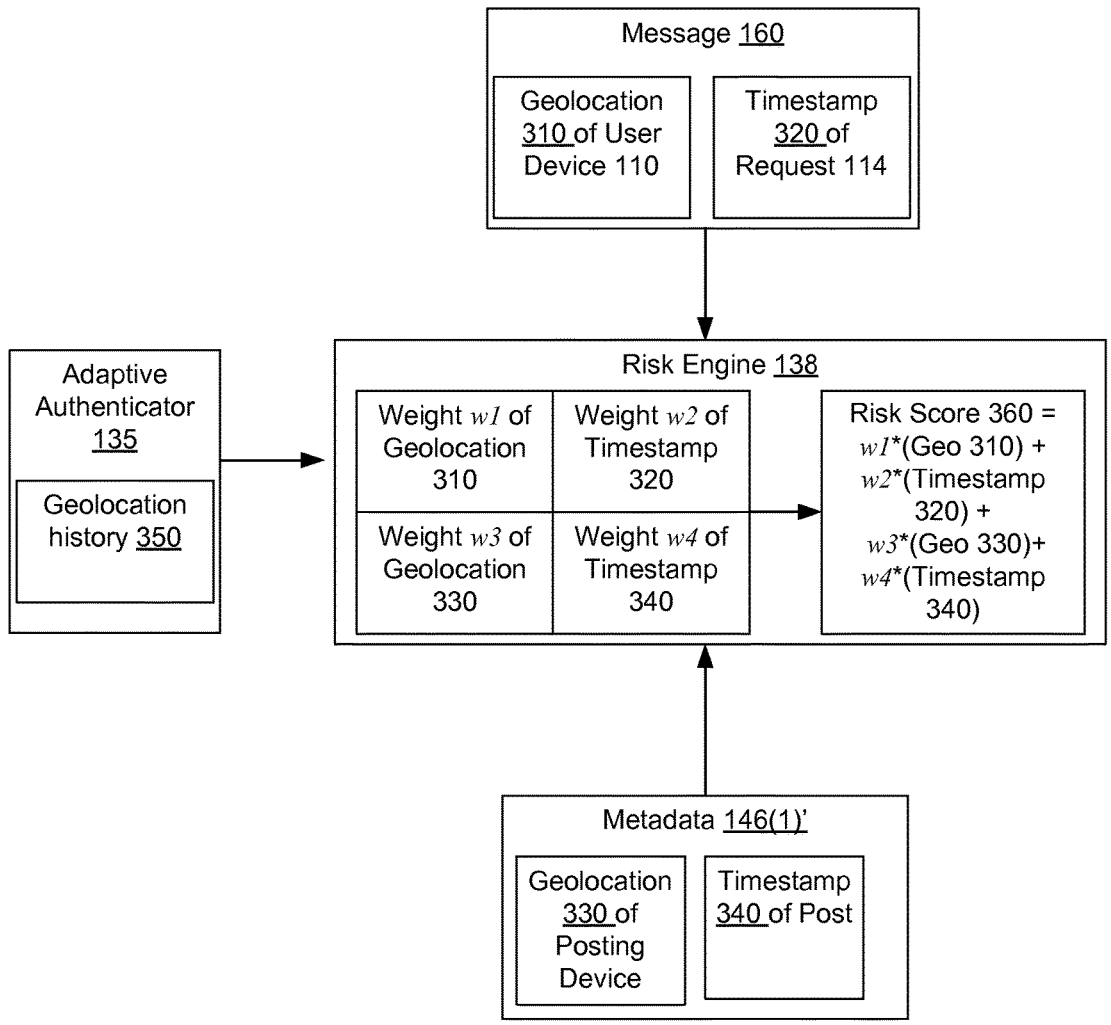
FIG. 3 is a block diagram illustrating an example adaptive authenticator and risk engine within the electronic environment illustrated in FIG. 1.

FIG. 3 shows detail of an example computation of a risk score 360 as a part of the generation of authentication result 180. In this example, the computation of risk score 360 is performed by risk engine 138 from inputs including message 160, metadata 146(1)', and adaptive authenticator 135.

As shown in FIG. 3, message 160 contains a geolocation value 310 and a timestamp 320. Geolocation value 310 includes latitude and longitude values as described in connection with FIG. 2. Metadata 146(1)' also contains a geolocation value 330 and a timestamp 340 as described in connection with FIG. 2.

As discussed in connection with FIG. 1, adaptive authenticator 135 is configured to provide patterns of fraud in geolocation history data 350 to risk engine 138 for computing risk score 360. It should be understood that risk score 360 indicates a likelihood of fraud associated with a geolocation of that request and a geolocation of a post made on social networking website 140(1). Some requests, typically those with high risk scores, may be investigated manually for actual evidence of fraud. Such evidence is transmitted back to adaptive authenticator 135 and stored as part of geolocation history data 350. Based on this evidence, risk engine 138 performs a machine learning operation, the output of which are weights corresponding to each authentication factor, e.g., geolocation values 310 (w1) and 330 (w3) and timestamps 320 (w2) and 340 (w4). Each of the weights indicates a significance of the factor to which that weight corresponds to the risk score and therefore to authentication result 180.

Upon receipt of request 114 and metadata 146(1) by authentication server 130, risk engine 138 multiplies each of the factors contained within (e.g., geolocation values 310 and 330, timestamps 320 and 340) by the corresponding weights and sums these products to form risk score 360.

In some arrangements, one may perform a simplified fraud likelihood estimate based on a speed that user 112 would have to travel in order to make request 114 on user device 110. In this simplified model, weights w1 and w3 may be set to +1, while weights w2 and w4 may be set to −1 to form a geolocation difference and a time difference. The speed would then be the ratio of the geolocation difference to the time difference. Such a speed may indicate how likely or unlikely it is that a user who made request 114 is the same user that made posts 144.

It should be understood, however, that risk engine 138 takes a more sophisticated approach based on a correlation of geolocations and times to actual fraud. For example, speed alone may not provide enough information to determine a likelihood of fraud. Specifically, it may be reasonable to assume that a user may travel 100 miles in 3 hours. However, that assumption changes when, for instance, the user made the post 144(1) from a boat in the ocean. The weights described above encapsulate particular information about geolocation 330 based on historical request data 350.

The above description of risk engine 138 assumed that credential 137 provides permission to obtain metadata 146 (1)' from social networking website 140(1). However, that may not always be the case.

Figure 4:
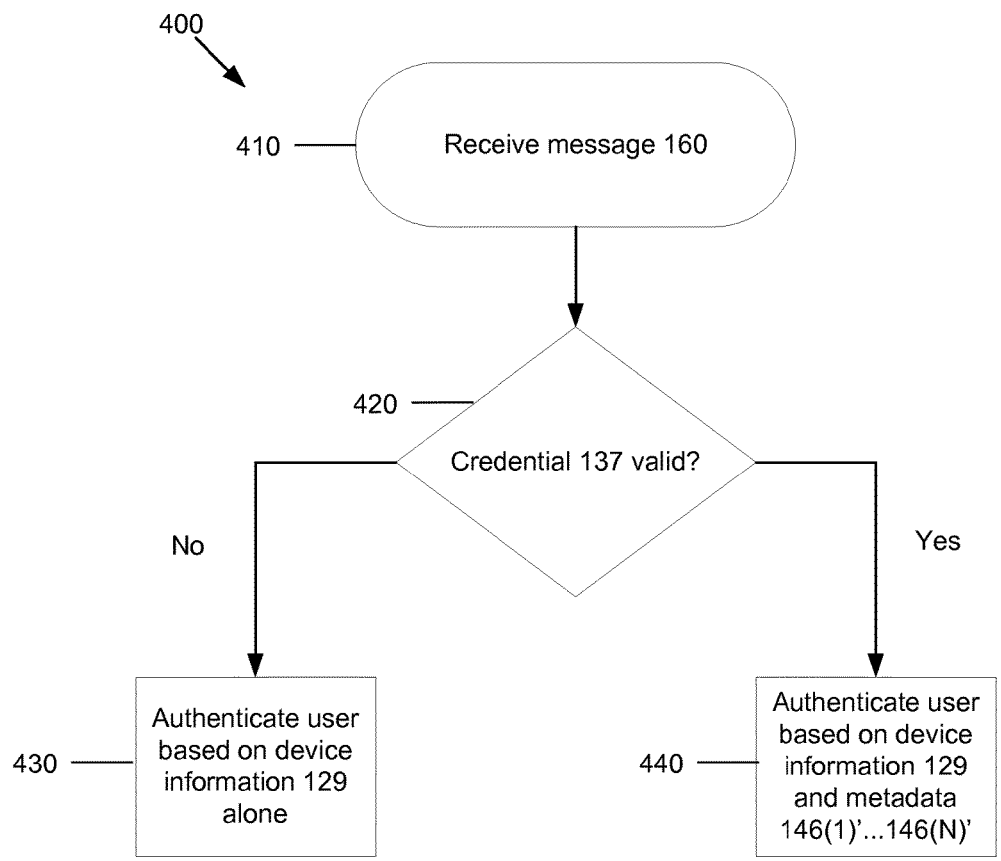
FIG. 4 is a flow chart illustrating an example authentication process carried out within the electronic environment illustrated in FIG. 1.

FIG. 4 shows an example procedure 400 for generating authentication factor 180 when permissions change. At 410, authentication server 130 receives message 160. At 420, authentication engine 130 attempts to obtain metadata 146 (1)' from social networking website 140(1) using credential 137. If credential 137 is deemed valid by API 148(1), then at 440, authentication server 130 returns authentication result 180 as described above, e.g., as a function of device information 129 and metadata 146(1)'. However, if credential 137 no deemed invalid by API 148(1) (e.g., permissions have expired or user 112 has revoked permissions), then at 430, authentication server 130 returns an authentication result that depends only on device information 129.

Figure 5:
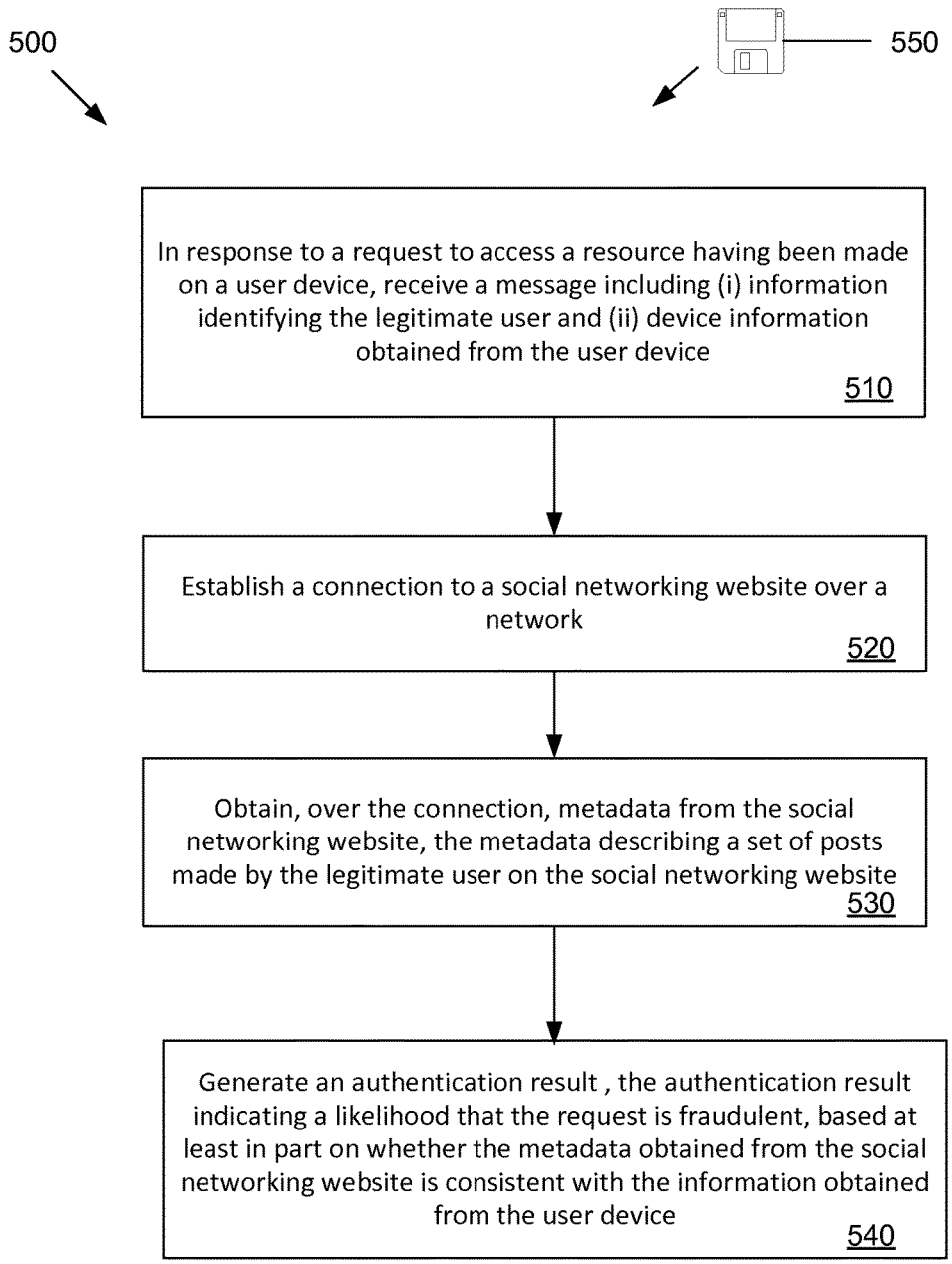
FIG. 5 is a flow chart illustrating a method of carrying out the improved technique within the electronic environment illustrated in FIG. 1.

FIG. 5 shows a method 500 of authenticating users requesting access to resources. At 510, in response to request 114 to access resource 128 from user device 110, authentication server 130 receives message 160 including (i) user identification information 127 and (ii) device information 129 obtained from user device 110 on which request 114 was made. In the examples provided above, user identification information 127 identifies user 112 and device information 129 contains geolocation values for user device 110.

At 520, authentication server 130 establishes a connection 150(1) to a social networking website 140(1) over network 170. Authentication server 130 establishes connection 150 (1) upon presentation of a valid credential 137 to API 148(1). Communication with API 148(1) is accomplished by commands generated by SDK 139.

At 530, authentication server 130 obtains metadata 146 (1)' from social networking website 140(1) over connection 150(1), metadata 146(1)' describing set of posts 144(1) made by user 112 on social networking website 140(1). In the examples above, metadata 146(1)' contains geolocation values for a posting device on which user 112 made posts 144(1) on social networking website 140(1).

At 540, authentication server 130 generates an authentication result 180 based on metadata 146(1)' and device information 129, authentication result 180 indicating a likelihood that the request is fraudulent, based at least in part of whether the metadata obtained from the social networking website is consistent with the information obtained from the user device. In the example described above, risk engine 138 takes as input the geolocations 310 and 330 and respective timestamps 320 and 340, as well as fraud evidence from adaptive authenticator 135, to determine how to compute a risk score as part of authentication result 180.

Improved of performing authentication involve extracting metadata from posts made by legitimate users on a social networking website and generating authentication results based in part on the extracted metadata. Advantageously, such metadata provides an independent check of a person requesting access to a resource, thus reducing the risk of fraud. This independence stems from the very low likelihood that a malicious actor that is controlling user device 110 might also have login credentials for logging into social networking website 140(1) as user 112. Thus, it may be assumed that metadata 146(1), 146(2), . . . , 146(N) is authentic, and that the authenticity of device information 129 needs to be proved. In the current state of the art, the authenticity of device information 129 is assumed. Unfortunately, as discussed above, such an assumption may allow a malicious actor to commit undetected fraud. Using the improved techniques described above, such fraud will likely be detected.

One should appreciate that the improvements disclosed herein amount to more than merely authenticating users requesting access to resources. Rather, the improved techniques disclosed herein involve invoking of out-of-band network connections in response to an in-band attempt to access a resource over the network. In particular, this specialized arrangement of network, storage, and processing hardware provides a novel approach to detecting fraud perpetuated by a malicious actor that controls a user device transparently to a legitimate user.

Having described certain embodiments, numerous alternate embodiments or variations can be made. For example, other metadata from posts 144(1) may be considered in the generation of authentication result 180. For example, some social networking websites offer services for which a user may make payments. The metadata may then include payment data that can be compared with any monetary data included in request 114.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 550 in FIG. 5). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Although certain embodiments are disclosed herein, it is understood that these are provided by way of example only and the invention is not limited to these particular embodiments.

Those skilled in the art will therefore understand that various changes in form and detail may be made to the embodiments disclosed herein without departing from the scope of the invention.

What is claimed is:

1. A method of authenticating users requesting access to resources, the method comprising:

in response to a request to access a resource from a user device of a legitimate user, receiving, by a server, a message including (i) information identifying the legitimate user and (ii) device information obtained from the user device, the device information including a current location of the user device;

establishing a connection to a social networking website over a network;

obtaining, over the connection, metadata from the social networking website, the metadata describing a set of posts made by the legitimate user on the social networking website and including, for each of the set of posts, location information identifying a location of the legitimate user when the respective post was made; and generating, by the server, an authentication result, the authentication result indicating a likelihood that the request is fraudulent, based at least in part on whether the location information obtained from the social networking website and the current location obtained from the user device indicate that the legitimate user plausibly could have both (i) made the set of posts and (ii) issued the request from the user device;

wherein the metadata from the social networking website includes (i) a timestamp indicating a time at which a most recent post was made by the legitimate user and (ii) a corresponding geolocation value identifying a location from which the most recent post was made by the legitimate user;

wherein the generating the authentication result includes:

calculating a distance between the current location of the user device and the geolocation value from which the most recent post was made;

calculating a time difference between a time of the request to access the resource and the time when the most recent post was made by the legitimate user; and outputting a conditional probability value that the legitimate user traveled the calculated distance within the calculated time difference, wherein outputting the conditional probability value includes providing, as the conditional probability value, a first value when the calculated distance is greater than a predetermined distance threshold and a second value when the calculated distance is less than the predetermined distance threshold; and wherein the method further comprises updating the predetermined distance threshold based upon results of a machine learning analysis of previous locations of the user device and geolocation values provided with posts of the legitimate user on the social networking website.

2. A method as in claim 1, wherein the device information includes (i) a value of a-geolocation of the user device and (ii) a timestamp indicating a time at which the request was made from the user device; and wherein generating the authentication result further includes:

evaluating a function having arguments including (i) the value of the geolocation of the user device, (ii) the value of the geolocation of the posting device from which the most recent post was made, (iii) the time at which the request was made on the user device, and (iv) the time at which the most recent post was made, and evaluating the function producing a function value, the function value indicating a likelihood that the legitimate user did not make both the request and the most recent post.

3. A method as in claim 2, further comprising:

establishing, by the server, a connection to a second social networking website over the network; and obtaining, over the connection to the second social networking website, metadata describing a second set of posts made by the legitimate user on the second social networking website, wherein generating the authentication result is based at least in part of whether the metadata obtained from the second social networking website is consistent with the metadata obtained from the social networking website and the information obtained from the user device.

4. A method as in claim 2, further comprising obtaining credentials of the legitimate user on the social networking website, wherein obtaining the metadata from the social networking website includes:

presenting the credentials to an application programming interface (API) of the social networking website for acceptance; and in response to the credentials being accepted by the API, retrieving the metadata from the API of the social networking website.

5. A method as in claim 4, further comprising:
in response to a second request to access the resource from the user device, receiving a second message including (i) information identifying the legitimate user and (ii) second device information obtained from the user device;
attempting to obtain, via the API, metadata from the social networking website;
in response to attempting to obtain the metadata, failing to receive the metadata; and
after failing to receive the metadata, generating a second authentication result based on the second device information and not based on metadata describing any post made by the user on the social networking website.

6. A method as in claim 2, wherein each of the arguments of the function is a value of an authentication factor having a weight, the weight of each authentication factor representing an impact of that authentication factor on the function value;
wherein evaluating the function includes summing pairwise products of values of authentication factors and weights of the authentication factors to form, as the function value, a risk score component.

7. A method as in claim 6, wherein summing the pairwise products includes:
generating a difference between (i) the value of geolocation of the user device and (ii) the value of geolocation of the posting device to produce a geolocation difference,
generating a difference between (i) the time at which the request was sent from the user device and (ii) the time at which the post was made by the user to produce a time difference; and
wherein evaluating the function further includes producing a ratio of the geolocation difference to the time difference, the ratio representing minimum speed at which the legitimate user would have had to travel between the geolocation of the posting device and the geolocation of the user device in order to send the request from the user device, the risk score component increasing with the ratio.

8. A method as in claim 2 wherein evaluating the function includes:
converting the value of the geolocation of the user device to a latitude coordinate and a longitude coordinate of the user device;
converting the value of the geolocation of the posting device from which the most recent post was made to a latitude coordinate and a longitude coordinate of the posting device;
calculating a distance between the latitude and longitude coordinates of the of the user device and the latitude and longitude coordinates of the of the posting device;
calculating a minimum speed of travel defined by the distance between the coordinates of the user device and the posting device divided by a difference between the time at which the request was made on the user device and the time at which the most recent post was made; and
forming, as the authentication, a value proportional to the minimum speed of travel.

9. An authentication system constructed and arranged to authenticate users requesting access to resources, the authentication system including:
memory; and
controlling circuitry coupled to the memory, the controlling circuitry being constructed and arranged to:
in response to a request to access a resource from a user device of a legitimate user, receive, by an authentication server, a message including (i) information identifying the legitimate user and (ii) device information obtained from the user device, the device information including a current location of the user device;
establish a connection to a social networking website over a network;
obtain metadata from the social networking website over the connection, the metadata describing a set of posts made by the legitimate user on the social networking website and including, for each of the set of posts, location information identifying a location of the legitimate user when the respective post was made; and
generate an authentication result, the authentication result indicating a likelihood that the request is fraudulent, based at least in part on whether the location information obtained from the social networking website and the current location obtained from the user device indicate that the legitimate user plausibly could have both (i) made the set of posts and (ii) issued the request from the user device;
wherein the metadata from the social networking website includes (i) a timestamp indicating a time at which a most recent post was made by the legitimate user and (ii) a corresponding geolocation value identifying a location from which the most recent post was made by the legitimate user;
wherein the generating the authentication result includes:
calculating a distance between the current location of the user device and the geolocation value from which the most recent post was made;
calculating a time difference between a time of the request to access the resource and the time when the most recent post was made by the legitimate user; and
outputting a conditional probability value that the legitimate user traveled the calculated distance within the calculated time difference, wherein outputting the conditional probability value includes providing, as the conditional probability value, a first value when the calculated distance is greater than a predetermined distance threshold and a second value when the calculated distance is less than the predetermined distance threshold; and
wherein the controlling circuitry is further constructed and arranged to update the predetermined distance threshold based upon results of a machine learning analysis of previous locations of the user device and geolocation values provided with posts of the legitimate user on the social networking website.

10. An authentication system as in claim 9, further comprising a resource server in communication with the authentication server over the network, the resource server including a controller having memory and controlling circuitry coupled to the memory of the resource server, the controlling circuitry of the resource server being constructed and arranged to:
receive the request to access the resource from the user device over the network, the request including (i) the information identifying the legitimate user and (ii) the device information obtained from the user device;

generate the message as a response to receiving the
request;
transmit the message to the authentication server over the
network;
after transmitting the message, receive the authentication
result over the network; and
grant or deny access to the resource based on the authentication result.

11. An authentication system as in claim 10, wherein the
controlling circuitry constructed and arranged to grant or
deny access to the resource based on the authentication
result is further constructed and arranged to:
grant access to the resource based on the authentication
result when the authentication result indicates that the
likelihood of the request being fraudulent is greater
than a specified threshold, and
deny access to the resource based on the authentication
result when the authentication result indicates that the
likelihood of the request being fraudulent is less than
the specified threshold.

12. An authentication system as in claim 10, wherein the
controlling circuitry of the authentication server is further
constructed and arranged to obtain credentials of the legitimate user on the social networking website; and
wherein the controlling circuitry constructed and arranged
to obtain the metadata from the social networking
website is further constructed and arranged to:
present the credentials to an application programming
interface (API) of the social networking website, and
retrieve the metadata from the API of the social networking website.

13. An authentication system as in claim 12, wherein the
controlling circuitry of the authentication server is further
constructed and arranged to:
in response to a second request to access the resource
from the user device, receive a second message including (i) information identifying the legitimate user and
(ii) second device information obtained from the user
device; attempt to obtain, via the API, metadata from
the social networking website;
in response to attempting to obtain the metadata, fail to
receive the metadata; and
after failing to receive the metadata, generate a second
authentication result based on the second device information and not on metadata describing any post made
by the user on the social networking website.

14. A computer program product comprising a non-transitory, computer-readable storage medium which stores
executable code, which when executed by a server computer, causes the computer to perform a method of authenticating users requesting access to resources, the method
comprising:
in response to a request to access a resource from a user
device of a legitimate user, receiving, by the server
computer, a message including (i) information identifying the legitimate user and (ii) device information
obtained from the user device, the device information
including a current location of the user device;
establishing, by the server computer, a connection to a
social networking website over a network;
obtaining, over the connection, by the server computer,
metadata from the social networking website, the metadata describing a set of posts made by the legitimate
user on the social networking website and including,
for each of the set of posts, location information
identifying a location of the legitimate user when the
respective post was made; and generating, by the server computer, an authentication
result, the authentication result indicating a likelihood
that the request is fraudulent, based at least in part on
whether the location information obtained from the
social networking and the current location obtained
from the user device indicate that the legitimate user
plausibly could have both (i) made the set of posts and
(ii) issued the request from the user device;
wherein the metadata from the social networking website
includes (i) a timestamp indicating a time at which a
most recent post was made by the legitimate user and
(ii) a corresponding geolocation value identifying a
location from which the most recent post was made by
the legitimate user;
wherein the generating the authentication result includes:
calculating a distance between the current location of
the user device and the geolocation value from which
the most recent post was made;
calculating a time difference between a time of the
request to access the resource and the time when the
most recent post was made by the legitimate user;
and
outputting a conditional probability value that the
legitimate user traveled the calculated distance
within the calculated time difference, wherein outputting the conditional probability value includes
providing, as the conditional probability value, a first
value when the calculated distance is greater than a
predetermined distance threshold and a second value
when the calculated distance is less than the predetermined distance threshold; and
wherein the method further comprises updating the predetermined distance threshold based upon results of a
machine learning analysis of previous locations of the
user device and geolocation values provided with posts
of the legitimate user on the social networking website.

15. A computer program product as in claim 14, wherein
the method further comprises obtaining credentials of the
legitimate user on the social networking website, and
wherein obtaining the metadata from the social networking website includes:
presenting the credentials to an application programming interface (API) of the social networking website; and
retrieving the metadata from the API of the social
networking website.

16. A method as in claim 15, wherein the executable code
includes a software development kit (SDK) for accessing the
social networking website, the SDK, when executed by the
server computer, causing the server computer to generate, in
response to receiving the message, a request to obtain the
metadata from the social networking website; and
wherein presenting the credentials to the API of the social
networking website includes generating the request to
obtain the metadata from the social networking website, the request including the credentials.

17. A computer program product as in claim 15, wherein
the method further comprises:
in response to a second request to access the resource
from the user device, receiving a second message
including (i) information identifying the legitimate user
and (ii) second device information obtained from the
user device;
attempting to obtain, via the API, metadata from the social
networking website;
in response to attempting to obtain the metadata, failing to
receive the metadata; and after failing to receive the metadata, generating a second authentication result based on the second device information and not on metadata describing any post made by the user on the social networking website.

* * * * *